United States Patent [19]
Boyer

[11] 4,194,412
[45] Mar. 25, 1980

[54] HANDWHEEL DISENGAGE MECHANISM
[75] Inventor: Harold E. Boyer, Anna, Ohio
[73] Assignee: Graphics Equipment International Corp., Chicago, Ill.
[21] Appl. No.: 734,211
[22] Filed: Oct. 20, 1976
[51] Int. Cl.² ............................................. G05G 1/10
[52] U.S. Cl. ...................................... 74/554; 74/527; 192/114 R; 74/3
[58] Field of Search ..................... 74/552, 554, 556, 3, 74/3.2, 527; 195/150, 140, 103 A, 104 R, 114 R, 106 R, 103 B, 103 C, 95, 89, 38; 64/28, 29, 30 A; 81/52.4, 52.4 A, 52.4 B

[56] References Cited
U.S. PATENT DOCUMENTS

| 979,530 | 12/1910 | McKee | 192/114 X |
|---|---|---|---|
| 2,045,572 | 6/1936 | Dow | 64/29 X |
| 2,137,417 | 11/1938 | Schaefer | 192/103 A X |
| 2,573,199 | 10/1951 | Holman | 74/527 X |
| 2,727,406 | 12/1955 | Opocensky | 192/114 X |
| 2,921,472 | 1/1960 | Friedman et al. | 74/5.7 X |
| 2,998,114 | 8/1961 | Altmann | 192/114 X |
| 3,016,759 | 1/1962 | Fletcher | 74/527 X |
| 3,520,392 | 7/1970 | Deremo et al. | 192/114 X |
| 3,552,147 | 1/1971 | Johansson et al. | 81/52.4 A X |
| 3,602,245 | 8/1971 | Meisel | 74/527 X |
| 3,817,361 | 6/1974 | Lundqvist | 192/95 |
| 3,826,156 | 7/1974 | Dornaus | 74/527 |
| 3,889,491 | 6/1975 | Wanner et al. | 64/29 |
| 3,986,409 | 10/1976 | Tripp et al. | 192/95 X |
| 4,037,488 | 7/1977 | Laney, Sr. | 74/548 |

FOREIGN PATENT DOCUMENTS
83738  1/1920  Fed. Rep. of Germany ........ 192/89 A

Primary Examiner—Samuel Scott
Assistant Examiner—Randall L. Green
Attorney, Agent, or Firm—Griffin, Branigan and Butler

[57] ABSTRACT

A mechanism is described for selectively engaging a handwheel with a shaft to manually rotate the shaft with the handwheel. The mechanism automatically disengages the handwheel from the shaft when the shaft is rotated by a power source above a predetermined speed. Further, when the shaft is thusly rotated by a power source, the mechanism does not allow an operator to engage the handwheel with the shaft. The mechanism includes a complementary groove system and a cam, one being on the shaft and the other on the handwheel. The groove system comprises at least two laterally-spaced grooves encircling the axis of the shaft, and a third groove spiralling about the axis between the first and second grooves. In one embodiment, the cam is mounted on the handwheel and rides in the grooves in the shaft. When the handwheel is axially depressed, to engage the shaft, the cam rides in the innermost encircling groove. But when the shaft rotates to rotate the handwheel above the predetermined speed, the cam cooperates with the spiral groove to move the cam to the outermost groove and the handwheel out of engagement with the shaft.

8 Claims, 4 Drawing Figures

HANDWHEEL DISENGAGE MECHANISM

BACKGROUND OF THE INVENTION

This invention relates generally to mechanisms for allowing selective engagement and disengagement between mechanical rotary elements and more particularly relates to such mechanisms which automatically disengage when one of the rotary elements is rotated by a power source above a predetermined speed.

When servicing many machines it is often necessary for operators to manually rotate shafts of the machines to adjust operational features of the machines. An example of this is found in buckle-type folders wherein buckle rolls must usually be hand rotated to adjust their "gaps" and "loads." In the prior art, easily-accessible handwheels have often been attached to shafts to enable operators to easily hand rotate the shafts. However, this structure has been found to be hazardous to operators in that the shafts, and the attached handwheels, often rotate at high speeds. Thus, when an operator inadvertently grabs or touches a rotating handwheel during operation of the machine, he can be severely injured. It is therefore an object of this invention to provide a mechanism which automatically disengages a handwheel from a shaft when the shaft is rotated above a predetermined speed.

It has been suggested to overcome the above-mentioned problem by providing a handwheel which is rotatively mounted on a stationary frame, but does not normally engage the shaft. In this respect, the handwheel is biased outwardly, away from engagement with the shaft, but can be depressed inwardly to engage the shaft. Thus, an operator can manually rotate the shaft by depressing the handwheel but when he releases the handwheel, the handwheel automatically disengages from the shaft so that the handwheel will not turn when the machine is operating. This handwheel mechanism has actually been found to have some features which are even more hazardous than the above-described handwheels that are attached directly to the shafts. In this respect, with a handwheel that can be selectively disengaged and engaged, an operator sometimes inadvertently engages the handwheel while its shaft is rapidly rotating, thereby causing a sudden rotation of the handwheel to the operator's injury. Thus, it is an object of this invention to provide a disengageable handwheel mechanism which cannot be inadvertently engaged with a shaft when the shaft is rotating above a predetermined speed.

Another difficulty with the above-described disengageable handwheel is that it does not remain engaged while adjustments are being made unless an operator maintains a depressing force on it. This feature is somewhat inconvenient for operators who are concentrating on the adjustment they are making and sometimes cannot continually maintain a depressing force. Thus, each time they wish to rotate a particular shaft, they must reengage its handwheel therewith. Therefore, it is yet another object of this invention to provide an automatic handwheel disengaging mechanism which allows a handwheel to remain engaged when it is released by an operator so long as the shaft is not rotated above a predetermined speed.

Finally, it is an object of this invention to provide a handwheel mechanism of the type described above which is uncomplicated and relatively easy to manufacture.

SUMMARY

According to one principle of this invention, a handwheel is mounted for rotation on a stationary frame sleeve and can be axially depressed along the sleeve to engage a shaft passing through the sleeve. The handwheel is biased outwardly along the sleeve, away from the shaft. Movement of the handwheel along the shaft is controlled by a cam riding in a groove system. The groove system includes outer and innermost grooves encircling the axis of shaft rotation and a helical groove extending between the outermost and innermost grooves. The helical groove spirals from the innermost groove to the outermost groove in the direction in which the shaft is rotated by a power source. Due to interaction of the cam and grooves, rotation of the shaft by the power source causes the handwheel to move outwardly toward a shaft disengaging position and will not allow the handwheel to be moved inwardly to a shaft engaging position so long as the shaft rotation continues.

BRIEF DESCRIPTION OF THE DRAWINGS

The foregoing and other objects, features, and advantages of the invention will be apparent from the following more particular description of the preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF PREFERRED EMBODIMENT

Figure 1:
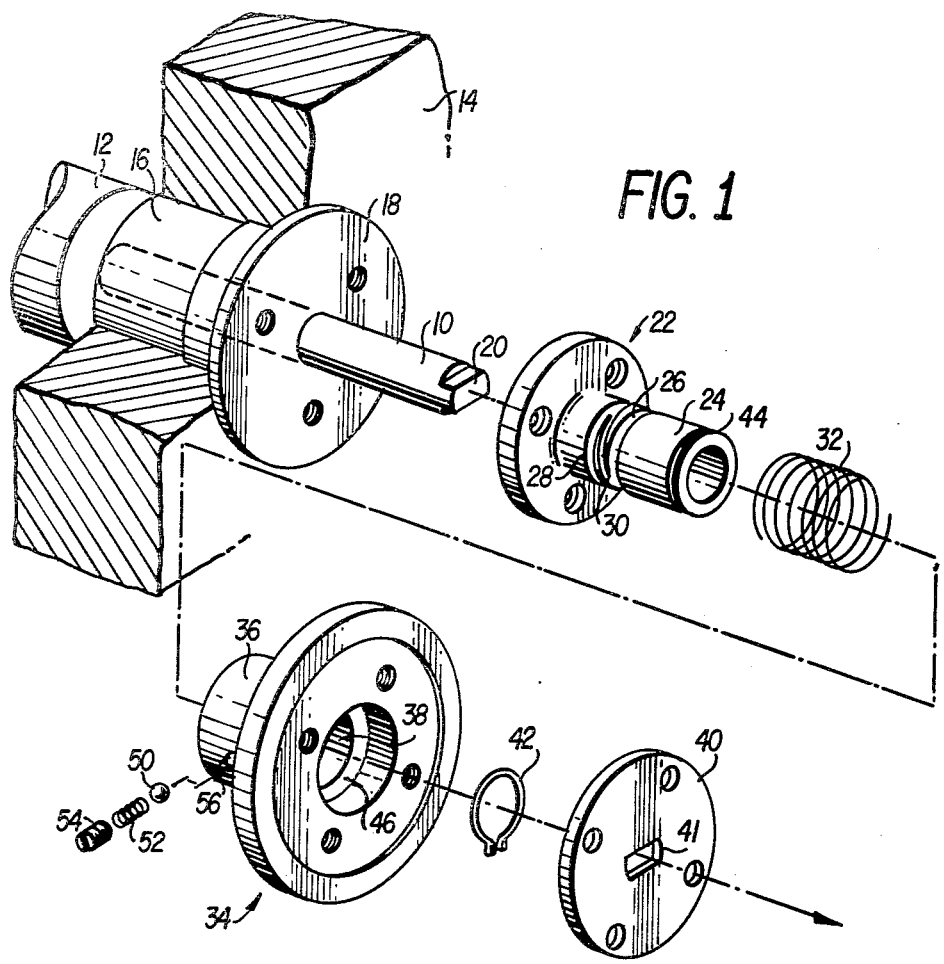
FIG. 1 is an exploded isometric view of a handwheel disengaging mechanism employing principles of this invention.
Figure 2:
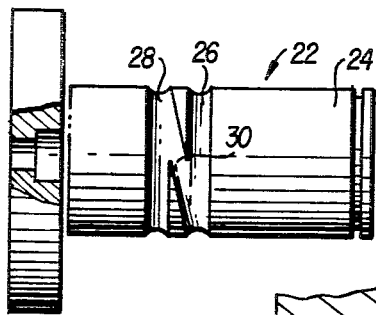
FIG. 2 is an enlarged side view of a frame sleeve that is employed in the mechanism of FIG. 1.
Figure 3:
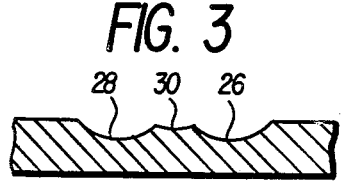
FIG. 3 is an enlarged sectional view of the groove portion of the frame sleeve of FIG. 2.
Figure 4:
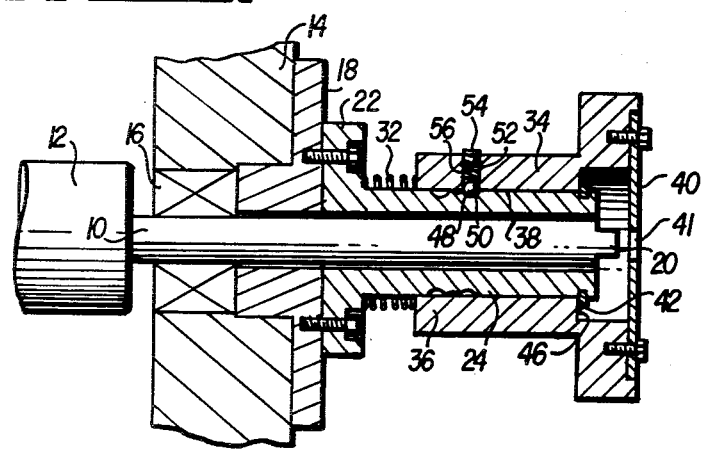
FIG. 4 is a sectional view of the mechanism of FIG. 1 when it is assembled.

Referring now to the drawings, a driven shaft 10 is attached to a roll 12 which is used in a buckle-folder for example. The shaft 10 is mounted for rotation on a frame 14 by bearings 16 or the like. The shaft 10 extends beyond a frame plate 18 and the shaft's outer portin 20 has a cross sectional shape which can be easily engaged for rotation.

A frame sleeve 22 is mounted on the frame plate 18 and includes a frame tubular portion 24 having a groove system on its outer surface. In this respect, the groove system includes an outermost groove 26, an innermost groove 28, and a helical groove 30. The outermost and innermost grooves 26 and 28 encircle the axis of rotation of the driven shaft 10 and are spaced from one another. The helical groove 30 spirals from the innermost groove 28 to the outermost groove 26 in the same direction as the driven shaft 10 is driven by a power source (not shown). In the preferred embodiment, the outermost and innermost grooves 26 and 28 are 0.250 inches apart. The helical groove has a pitch of 0.500 inch per turn and a depth which is 0.010 inch less than the depths of the outermost and innermost grooves 26 and 28. This reduced depth increases the force necessary for moving a cam between the first and second grooves 26 and 28 along the helical groove 30.

A compression spring 32 is mounted about the tubular portion 24 of the frame sleeve 22 for biasing a handwheel 34 outwardly.

The handwheel 34 includes a handwheel tubular portion 36. A bore 38 of the handwheel tubular portion 36 extends through the handwheel. A shaft-engaging plate 40 is bolted onto an outer surface of the handwheel 34 such that an engaging opening 41 of the shaft-engaging plate is aligned with the bore 38.

The handwheel 34 is mounted on the frame tubular portion 24 of the frame sleeve 22 with the handwheel tubular portion 36 telescoping onto the frame tubular portion 24. A retaining ring 42 engages a groove 44 in the frame tubular portion 24 to hold the handwheel 34 on the frame tubular portion 24. In this respect, the handwheel is biased outwardly by the compression spring 32 until a shoulder 46 of the handwheel engages the retaining ring 42. In this position, the engaging opening 41 of the shaft-engaging plate 40, does not engage the shaft outer portion 20.

The handwheel tubular portion 36 includes a recess 48 adjacent to the bore 38 in which is mounted a 3/16th inch ball or cam 50 for engaging the outermost, innermost, and helical grooves 26, 28, and 30. The ball or cam, 50 is biased inwardly toward the grooves by a compression spring 52. A set screw 54 is screwed into a threaded hole 56 in the handwheel tubular portion 36 to adjust the pressure on the ball, or cam, 50.

In operation, the handwheel 34 has two extreme operation positions, the first being its fully disengaged position with its shoulder 46 against the retaining ring 42 and the ball 50 riding in the outermost groove 26 and the second being its fully-engaged position in which the ball 50 rides in the innermost grooves 28. To be moved between these positions, the handwheel 34 must be slightly rotated in a clockwise direction such that the ball 50 rides along the helical groove 30.

If the handwheel is in a fully-disengaged position and the shaft 10 is rotating, when an operator attempts to move the handwheel inwardly toward the fully-engaged position, as soon as the shaft-engaging plate 40 makes contact with the outer tip of the shaft's outer portion 20, the plate will be nudged in a clockwise direction which, because of engagement of the ball 50 and the helical groove 30, causes an outward motion of the handwheel 34 thereby preventing engagement between the shaft-engaging plate 40 and the shaft outer portion 20. In practice, when one attempts to move the handwheel 34 inwardly with the shaft 10 rotating, he feels a slight movement of the handwheel upon impingement of the shaft-engaging plate 40 with the outer tip of the shaft outer portion 20 but there is no engagement. In this respect, it should be appreciated that it is virtually impossible for the handwheel 34 to rotate with the shaft so long as the ball 50 is riding in the helical groove 30, which it is when one attempts to move the handwheel 34 toward the fully-engaged position.

On the other hand, when an operator attempts to engage the handwheel 34 with the shaft 10 when it is not rotating, he merely moves the handwheel inwardly, with the ball 50 riding in the helical groove 30 until there is engagement between the engaging opening 41 of the shaftengaging plate 40 with the shaft outer portion 20. The operator continues to depress the handwheel until the ball 50 rides in the innermost groove 28. The operator can thereafter release the handwheel 3 and, because the ball 50 is retained in the innermost groove 28, the handwheel will not move toward its fully disengaged position. Similarly, when the operator so desires, he can rotate the handwheel in a clockwise direction without fear that the ball 50 will ride outwardly in the helical groove 30 and he can rotate the handwheel 34 in a counterclockwise direction so long as he applies a slight inward force to the handwheel when the ball 50 is at the mouth of the helical groove 30.

However, should the shaft 10 suddenly be driven to rotate by a power source in the clockwise direction, the ball 50 will cooperate with the helical groove 30 and the compression spring 32 to move the handwheel 34 outwardly to a fully disengaged position. In this respect, it should be kept in mind that the compression spring 32 applies continual outward pressure on the handwheel 34 to aid the ball 50 to enter the mouth of the helical groove 30.

It will be appreciaed by those skilled in the art that the handwheel disengage mechanism described herein allows an operator to easily move a handwheel to a fully engaged position but does not have the disadvantage of allowing the handwheel to move back to a fully disengaged position when the operator releases the handwheel. Further, the mechanism described herein automatically disengages the handwheel upon commencement of rotation of a shaft by a power source and does not allow reengagement of the handwheel when a shaft is rotating.

While the invention has been particularly shown and described with reference to a preferred embodiment, it will be understood by those skilled in the art that various changes in form and detail may be made therein without departing from the spirit and scope of the invention. For example, the ball 50 could be on the frame tubular portion 24 and the grooves could be in the bore 38 of the handwheel 34. In addition, other types of cams could be used besides the ball 50. Still further, the tubular portion 24 could telescope onto the outside of the handwheel tubular portion 36 rather than on the inside thereof. In this case, the positions of the grooves and cam would still be interchangable.

The embodiments of the invention in which an exclusive property or privilege are claimed are defined as follows:

1. An automatic disengaging mechanism for automatically disengaging a first member from a shaft when the shaft rotates in a predetermined direction and for preventing engagement of the first member with the shaft when the shaft rotates above a predetermined speed in said predetermined direction, said disengaging mechanism comprising:

a stationary frame having said shaft rotatably mounted thereon, said stationary frame including a second member, said shaft passing through a shaft cavity in said second member;

said first member also being rotatably mounted on said second member adjacent said shaft and being axially movable relative to said stationary frame, said first member including an engaging and disengaging means for engaging said shaft when said first member is in an engaging axial position so that said shaft and first member rotate together and for disengaging said shaft when said first member is in a disengaging axial position so that said shaft and first member can rotate independently;

said first member defining a cylindrically-shaped cavity surface and said second member including a complementary cylindrically-shaped surface positioned in the cylindrically-shaped cavity;

said complementary cylindrically-shaped surface including at least three grooves thereon, the first of the grooves encircling the shaft axis, the second of said grooves also encircling the shaft axis but being axially spaced from the first groove, and the third of said grooves spiraling about the shaft axis between the first and second grooves; and said cylindrically-shaped cavity surface including a cam for riding in said grooves.

2. An automatic disengaging mechanism as in claim 1 including a cam biasing means for biasing said cam toward said grooves and wherein said first and second grooves are deeper than said third groove.

3. An automatic disengaging mechanism as in claim 2 wherein said third groove has a depth of approximately 0.01 inches less than the depths of said first and second grooves.

4. An automatic disengaging mechanism as in claim 2 wherein is further included a biasing means for biasing said first member on said second member toward said disengaging axial position in which said cam will engage said first groove, said first member being movable axially, against said bias, toward said engaging axial position in which said cam will engage said second groove.

5. An automatic disengaging mechanism as in claim 1 wherein is further included a biasing means for biasing said first member on said second member toward said disengaging axial position in which said cam will engage said first groove, said first member being movable axially, against said bias, toward said engaging axial position in which said cam will engage said second groove.

6. An automatic disengaging mechanism as in claim 1 wherein said first and second grooves are spaced approximately 0.250 inch apart and said third groove has a pitch of approximately 0.500 inch per turn and the depth of said third groove is approximately 0.01 inches less than the depths of said first and second grooves.

7. An automatic disengaging mechanism allowing engagement between a first member and a shaft, but automatically disengaging the first member from the shaft when the shaft rotates in a first direction and for preventing engagement of the first member with the shaft when the shaft rotates in said first direction above a predetermined speed, said disengaging mechanism comprising:

a stationary frame having said shaft rotatably mounted thereon, said stationary frame including a second member, said shaft passing through a shaft cavity in said second member;

said first member also being rotatably mounted on said second member adjacent said shaft and being axially movable relative to said stationary frame, said first member including an engaging and disengaging means for engaging said shaft when said first member is in an engaging axial position so that said shaft and first member rotate together and for disengaging said shaft when said first member is in a disengaging axial position so that said shaft and said first member can rotate independently;

said first member defining a cylindrically-shaped cavity surface and said second member including a complementary cylindrically-shaped surface positioned in the cylindrically-shaped cavity;

a cam means comprising:
  (i) cam grooves positioned on said complementary cylindrically-shaped surface and,
  (ii) a cam groove follower positioned on said cylindrically-shaped cavity surface for engaging said cam grooves, said cam means allowing said first member to be moved between said engaging and disengaging axial positions, and to remain in either position without the continual application of external axial force when said shaft rotates in a second direction, but causing said first member to automatically move to said disengaging axial position when said shaft rotates in said first direction.

8. An automatic disengaging mechanism as in claim 7 wherein said cam grooves and said cam groove follower interact to prevent manual movement of said first member from said disengaging axial position to said engaging axial position when said shaft is rotated in said first direction above said predetermined speed.

* * * * *